United States Patent Office 3,645,916
Patented Feb. 29, 1972

3,645,916
METALLIC MORTARS
William Cornelius Hall, Albany Turnpike, Central Valley, N.Y. 10917, and John Merriam Peterson, Foleman Road, Rock Tavern, N.Y. 12575
No Drawing. Filed Nov. 2, 1967, Ser. No. 679,981
Int. Cl. C04b 31/18, 35/68
U.S. Cl. 252—478
21 Claims

ABSTRACT OF THE DISCLOSURE

Metallic mortars containing an iron ore concentrate characterized by its high bulk density, its blackish shining appearance, and its sharp crystalline corners and flat cleavage planes, uniformly dispersed as a fine aggregate throughout an inorganic cement matrix.

The present invention relates to novel metallic mortars. More particularly, the invention relates to metallic mortars which can be mixed with water to form high density radiation shielding concrete structures having desirable structural properties.

The large number of nuclear power plants already in use and under construction, together with those announced as part of future planning, clearly demonstrates that expansion in this area is accelerating. Such installations are always accompanied by serious health hazards and, consequently, suitable radiation shielding materials to eliminate such hazards are receiving increasing serious consideration.

Each application, of course, presents its own special radiation problems and an appropriate shielding material must be chosen in each case. However, the attenuating efficiency of the material is only one of the factors to be considered. Other factors such as mass volume, material cost, ease of application and structural properties must also be considered in selecting the proper material.

For large scale installations, the cost and the structural properties of the shielding material are often the controlling factors. Concrete is one of the most common materials used for such purposes, because of its low cost and good structural properties, as well as for its ease of application. Concrete attenuates both neutrons and gamma rays reasonably well, although the effectiveness thereof varies somewhat with its composition.

A large number of concrete formulations using various types of aggregates dispersed therethrough have also been employed as radiation shielding materials. Among these are a number of mixtures which produce so-called "high-density" concretes. These concretes have improved properties with respect to shielding efficiency and are used frequently in cases where the desired level of shielding cannot be achieved economically using conventional concrete, because of space limitations or other limitations in conditions of construction and use. Aggregates often used in such high-density concretes include natural metallic ores, such as barite, magnelite and ilmenite, as well as manufactured metals, such as iron and steel, in the form of punchings, shot or scrap.

The use of natural ores often leads to a structure which is non-uniform in composition, since the particle size distribution of the ore as it comes from the mine in these cases is not easily reproducible from one delivery to the next. The use of manufactured metals, such as iron shot, generally results in material costs appreciably higher than those for ordinary concrete.

It is an object of the invention to provide a novel metallic mortar which, when admixed with water and allowed to set, will produce a high density concrete having desirable characteristics. It is another object of the invention to provide a metallic mortar which is free of one or more of the disadvantages of the prior art materials. These and other objects of the invention will in part be described and in part become obvious to one skilled in the art in the light of the instant specification.

In its broad aspect, the invention relates to a metallic mortar which contains an iron ore concentrate characterized by its high bulk density, its blackish shining appearance, and its sharp crystalline corners and flat cleavage planes, uniformly dispersed as a fine aggregate throughout an inorganic cement matrix. It has been found that the use of said particulate iron ore concentrate as a cement aggregate results in radiation shielding structures having numerous desirable properties, i.e., low cost, high density, ease of fabrication, good structural properties, and the like.

The particular iron ore concentrate preferred in the practice of the invention is obtained by purifying certain hematite ores to a concentrate having a high ferric oxide content, in the order of about 90 to 95 weight percent by weight, and having the characteristics hereinbefore defined. The preferred concentrate is obtained by the purification of gray hematite, or specularite.

Gray hematite, characterized by its disk-like crystals with bright metallic luster, is purified, for example, by crushing and processing in a Humphrey's Spiral. This equipment, by gravity separation, concentrates the ferric oxide content of the natural ore by removing large proportions of impurities present therein and yields a product of substantially controlled reproducible particle size eminently suitable for use in the present invention.

For example, a natural gray hematite ore processed as indicated above gave a product containing about 90–95 weight percent of ferric oxide, with a bulk density of from about 160 to about 190 pounds per cubic foot. The ore concentrate, nearly black in color, glistened brightly, showed sharp crystalline corners, flat cleavage planes, and was substantially free of dust. The particles had the further advantage of being hard and not being easily broken on handling.

A typical screen analysis of the product gave the following particle size distribution:

| Mesh: | Percentage (weight) |
|---|---|
| +8 | 0.1 |
| +10 | 3.1 |
| +14 | 8.9 |
| +20 | 13.2 |
| +28 | 17.7 |
| +35 | 17.7 |
| +48 | 14.3 |
| +65 | 11.1 |
| +100 | 6.8 |
| +150 | 3.6 |
| +200 | 1.7 |
| −200 | 0.8 |
| Total | 100.0 |

Chemical analysis of the product, in its natural state and after being dried at 100° C., gave the following results:

| | Natural, percent | Dried, percent |
|---|---|---|
| Fe | 64.22 | 66.00 |
| P | | 0.025 |
| $SiO_2$ | | 5.00 |
| Mn | | 0.03 |
| $Al_2O_3$ | | 0.75 |
| S | | 0.006 |
| $H_2O$ | 2.70 | |

The inorganic cement component of the compositions of the invention is, preferably, portland cement although various other types of cement, such as magnesium oxychloride cement, can be usefully employed.

Another inorganic cement whic his most preferably suitable in the practice of the present invention is that which is produced from pure calcite limestone. Such cement is commonly known as "white cement" due to its low iron oxide content, iron oxide being the component which imparts the characteristic greyish color to standard cements.

Such white cements contain calcium, calculated as CaO, in an amount in excess of about 64.5% by weight, sodium compounds in an amount of less than about 0.5% by weight, and compounds of higher Z elements, calculated as the oxides, in an amount of less than about 2.5% by weight.

A typical analysis of white cement is as follows:

|  | Percent |
|---|---|
| CaO | 65 |
| $SiO_2$ | 25.5 |
| $Al_2O_3$ | 5.9 |
| $Fe_2O_3$ | 0.6 |
| MgO | 1.1 |
| $SO_3$ | 0.1 |

The ratios of the components in the present compositions are not narrowly critical and, in general, can be chosen as to obtain the desired conditions. A ratio in the range of from 1 to 4 parts of concentrated iron ore per part of cement by volume, and preferably from 1 to 3 parts of concentrated iron ore per part of cement, has been found to give cured compositions having good structural strengths as well as good radiation attenuating properties.

Several typical mixtures of various compositions containing portland cement and concentrated gray hematite ore were molded for physical test purposes. These were compared with similarly prepared specimens with sand replacing the concentrated iron ore as the fine aggregate.

All samples were prepared by thoroughly admixing the dry materials, measured on a volume basis, and adding thereto carefully controlled amounts of water to produce a stiff mortar. Mortars were cast into cylinders, two inches in diameter and four inches in length, for compressive strength and density determinations. A standard mold with a one square inch neck was used for tensile strength tests. Cure time for the samples was one year at an average temperature of approximately 70° F.

Measurements were made on standard Tinius-Olsen laboratory test machines, with controlled leading rates. Results obtained are shown in Table I, which follows:

TABLE I

| Sample No. | Composition (parts by volume) | | | Density | | Strength (p.s.i.) | |
|---|---|---|---|---|---|---|---|
|  | PC[1] | IOC[2] | Sand | G./cc. | Lb./cu. ft. | Tensile | Compressive |
| 1 | 1 | 1 | 0 | 3.41 | 213 | 680 | 6,003 |
| 2 | 1 | 2 | 0 | 3.60 | 225 | 691 | 4,014 |
| 3 | 1 | 3 | 0 | 3.35 | 209 | 461 | 2,428 |
| 4 | 1 | 4 | 0 | 3.22 | 201 | 217 | 852 |
| 5 | 1 | 0 | 1 | 2.07 | 129 | 586 | 5,740 |
| 6 | 1 | 0 | 2 | 2.10 | 131 | 629 | 3,798 |
| 7 | 1 | 0 | 3 | 2.03 | 127 | 368 | 2,038 |
| 8 | 1 | 0 | 4 | 2.00 | 125 | 291 | 1,400 |

[1] Portland cement.
[2] Iron ore concentrate.

As is apparent from the tabulated results, the density of samples wherein the iron ore concentrate was used as the fine aggregate is approximately 66 percent higher than the corresponding specimens formulated with sand. In addition, both tensile and compressive strengths were also higher for cement to aggregate ratios as high as 1 to 3.

In order to prove that the desirable features are characteristic of the particular iron ore concentrates described above, comparative tests were made using as the fine aggregate in portland cement a Venezuelan natural iron ore and technical grade ferric oxide. The volume ratio of aggregate to cement was 3 parts to one. The results are tabulated below:

| Aggregate | Density | | Strength (p.s.i.) | |
|---|---|---|---|---|
|  | G./cc | Lb./cu. ft. | Tensile | Compressive |
| Venezuelan natural iron ore | 3.01 | 188 | 310 | 1,960 |
| Technical grade ferric oxide | 3.12 | 195 | 298 | 1,721 |

As is apparent, density, and tensile and compressive strengths were all inferior to those obtained using the iron ore concentrate and shown in Table I.

As indicated before, the compositions of the present invention are easy to work with and can be mixed with water to the desired consistency and used as normal concrete. They can not only be poured from a mixer or precast, but can also be sprayed or plastered. Good masonry practice with the present compositions prevents voiding, which is extremely undesirable in the fabrication of radiation shielding structures. Indeed, the present products are very suitable for filling holes and other penetrations where, for example, wiring or pipes pass through the major structure and where, previously, lead wool had been laboriously rammed.

The compositions of the invention can, if desired, contain one or more additives which will impart beneficial effects to the final structures. For example, it has been found that the addition of finely divided carbon, such as lamp black, charcoal or ground coal, in amounts up to about 20 percent of the dry compositions, by volume, not only improved the plasticity of the freshly prepared mortars, but also improved the ability of the final structures to moderate high energy neutrons to thermal energies where they may be captured by suitable capture elements.

Other suitable additives comprise capture elements, such as lithium, boron, samarium, europium, gadolinium, or dysprosium, added either in their pure form or as compounds, i.e., oxides or carbonates.

It is apparent from the disclosure that the compositions of the invention may be modified by the incorporation therein of suitable additives to fit the desired application. Alternatively, more than one layer of shielding may be used, utilizing the novel mortars of the invention, to effect the desired degree of attenuation.

For example, a high energy neutron flux can be attenuated by using a source face layer, prepared from a mortar of the invention having carbon therein as a neutron moderator element, and a second layer, also prepared by a mortar of the invention having a neutron capture element, such as boron, dispersed therein.

In addition to the uses described above, the mortars of the present invention can be suitably used in many other applications. For example, shielding of gamma emitting isotopes, such as cobalt-60 and cesium-137, which are being increasingly used for medical therapy, for non-destructive testing in industry, and for irradiation of food and materials, can be conveniently and efficiently done by using the metallic mortars of the invention. Similarly, the present compositions can be used in shielding X-ray facilities in hospitals, clinics, and industrial installations. Many of these situations require shielding which is less bulky than standard concrete, but are not of a scale to justify the use of lead, tungsten or steel. The metallic mortars of the invention have the efficiency and the cost range to be eminently suitable in these applications.

It should be understood that the invention is not limited to the details of the foregoing description and that changes and additions may be made by those skilled in the art without departing from the scope and spirit of the invention. For example, as indicated above, various additives can be added to the basic compositions of the invention to modify the radiation shielding characteristics as desired. In addition, the physical characteristics can also be modified by the incorporation therein of various additives. For example, if a very high density concrete is desired, steel punchings, shot or scrap of any desired particle size can be added to the basic metallic mortars of the invention.

What is claimed is:

1. A metallic mortar comprising an inorganic cement matrix, and an iron ore concentrate characterized by high bulk density, a blackish shining appearance, and sharp crystalline corners and flat cleavage planes, said concentrate being of particles in major proportion between +8 and +150 mesh and being uniformly dispersed as a fine aggregate throughout an inorganic cement matrix, said particles being in major proportion larger than 100 mesh.

2. The metallic mortar of claim 1 wherein the cement is portland cement.

3. The metallic mortar of claim 1 wherein the cement is a white cement.

4. The metallic mortar of claim 1 wherein the iron ore concentrate has a bulk density of from about 160 to about 190 pounds per cubic foot.

5. The metallic mortar of claim 1 wherein the volume ratio of iron ore concentrate to cement is from about 1 to about 4 parts per part of cement.

6. The metallic mortar of claim 5 wherein the volume ratio of iron ore concentrate to cement is from about 1 to about 3 parts per part of cement.

7. The metallic mortar of claim 1 wherein there is dispersed therethrough finely divided carbon in an amount up to 20 percent by volume, based on the volume of the metallic mortar.

8. A metallic mortar comprising an inorganic cement matrix, and gray hematite, concentrated to a ferric oxide content of from 90 to 95 percent by weight, said hematite being of particles in major proportion between +8 and +150 mesh and being uniformly dispersed as a fine aggregate throughout an inorganic cement matrix, said particles being in major proportion larger than 100 mesh.

9. The metallic mortar of claim 8 wherein the cement is portland cement.

10. The metallic mortar of claim 8 wherein the cement is a white cement.

11. The metallic mortar of claim 8 wherein the gray hematite concentrate has a bulk density of from about 160 to about 190 pounds per cubic foot.

12. The metallic mortar of claim 8 wherein the volume ratio of gray hematite concentrate to cement is from about 1 to about 4 parts per part of cement.

13. The metallic mortar of claim 12 wherein the volume ratio of gray hematite concentrate to cement is from about 1 to about 3 parts per part of cement.

14. The metallic mortar of claim 8 wherein there is dispersed therethrough finely divided carbon in an amount up to 20 percent by volume, based on the volume of the metallic mortar.

15. A method of making a radiation shielding concrete having a bulk density in excess of 200 pounds per cubic foot, said method comprising admixing with water a metallic mortar comprising from about 1 to about 4 parts by volume of a gray hematite concentrate having a ferric oxide content of from about 90 to 95 percent by weight and about 1 part by volume of an inorganic cement, said concentrate being of particles in major proportion between +8 and +150 mesh and being uniformly dispersed as a fine aggregate throughout said cement, and allowing said metallic mortar to set, said particles being in major proportion larger than 100 mesh.

16. The radiation shielding concrete of claim 15 wherein the cement is portland cement.

17. The radiation shielding concrete of claim 15 wherein the cement is a white cement.

18. The radiation shielding concrete of claim 15 wherein the volume ratio of concentrate to cement is from about 1 to about 3 parts per part of cement.

19. A mortar as claimed in claim 1 wherein said particles are in major proportion larger than 100 mesh.

20. A mortar as claimed in claim 8 wherein said particles are in major proportion larger than 100 mesh.

21. A method as claimed in claim 15 wherein said particles are in major proportion larger than 100 mesh.

References Cited

UNITED STATES PATENTS

| | | | |
|---|---|---|---|
| 2,013,811 | 9/1935 | Smith | 106—118 |
| 2,987,406 | 6/1961 | Minnick | 252—478 |
| 3,207,705 | 9/1965 | Hall | 252—478 |

LELAND A. SEBASTIAN, Primary Examiner

S. HELLMAN, Assistant Examiner

U.S. Cl. X.R.

250—108